March 28, 1933.  J. H. McEACHERN  1,902,876

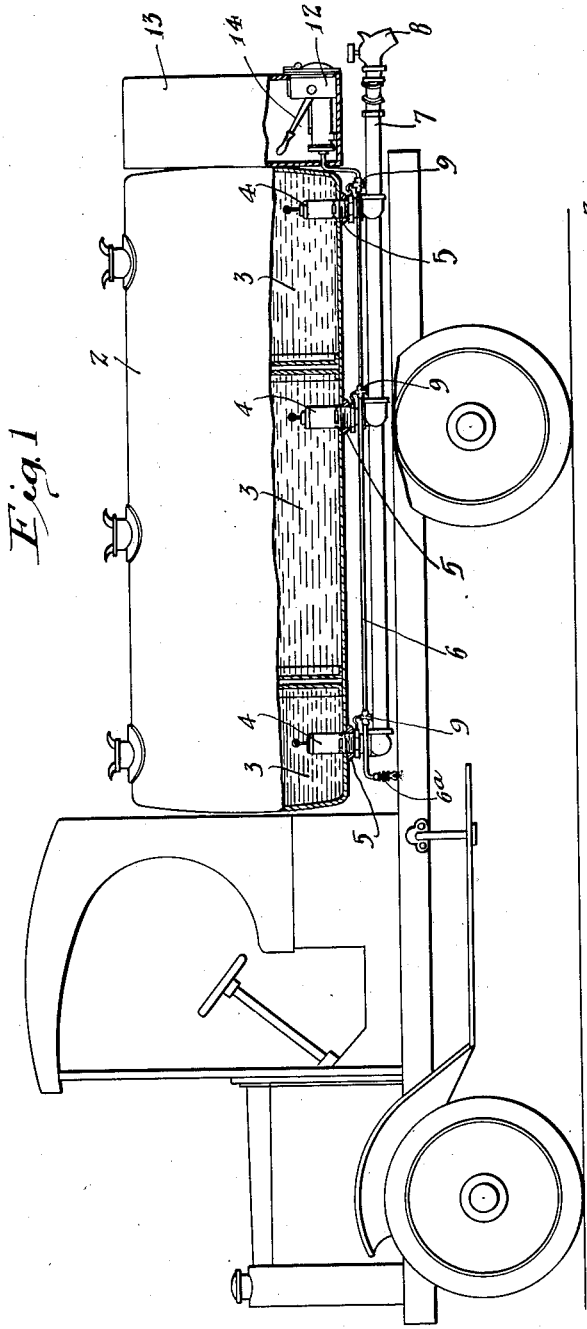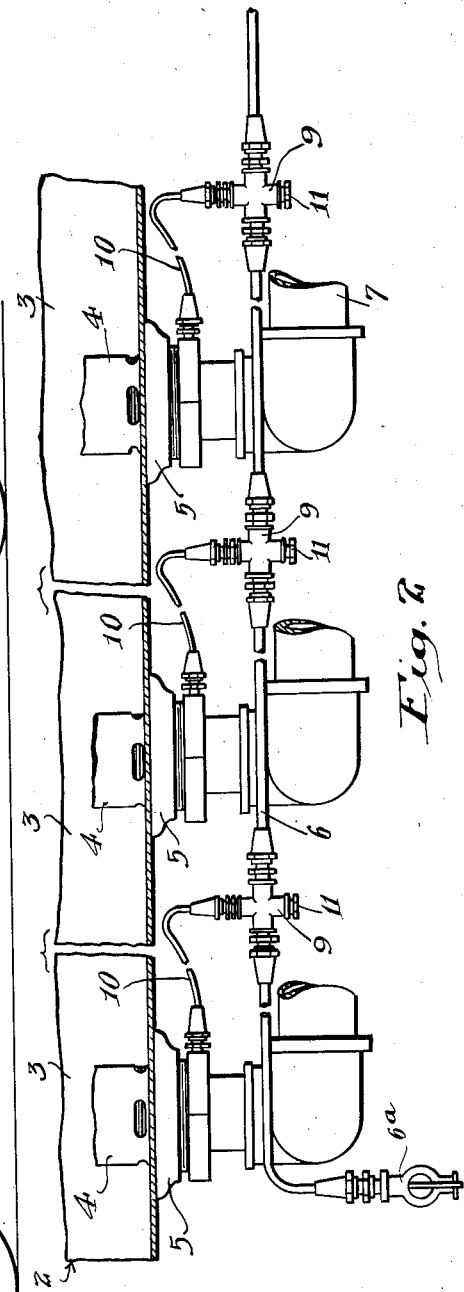

TANK TRUCK EMERGENCY VALVE SYSTEM AND CONTROLLER

Original Filed Nov. 4, 1924   3 Sheets-Sheet 2

Inventor
Joseph H. McEachern
By Lyon & Lyon
Attorneys

March 28, 1933. J. H. McEACHERN 1,902,876
TANK TRUCK EMERGENCY VALVE SYSTEM AND CONTROLLER
Original Filed Nov. 4, 1924 3 Sheets-Sheet 3
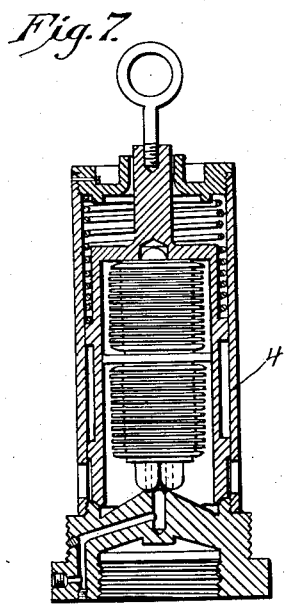
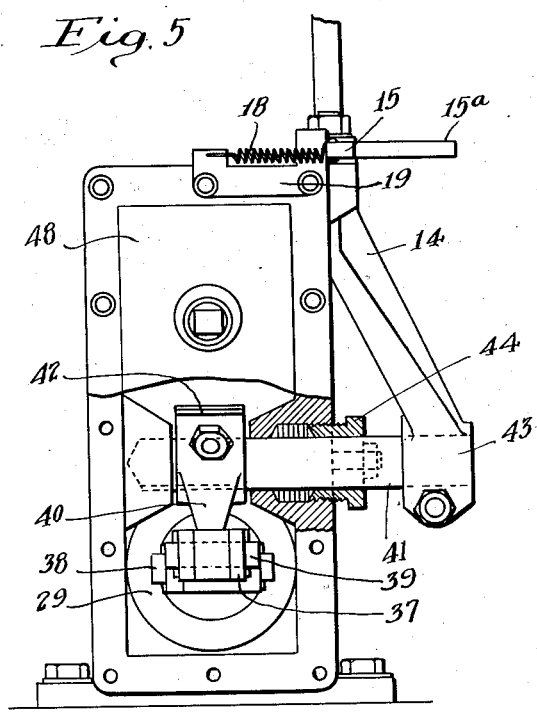
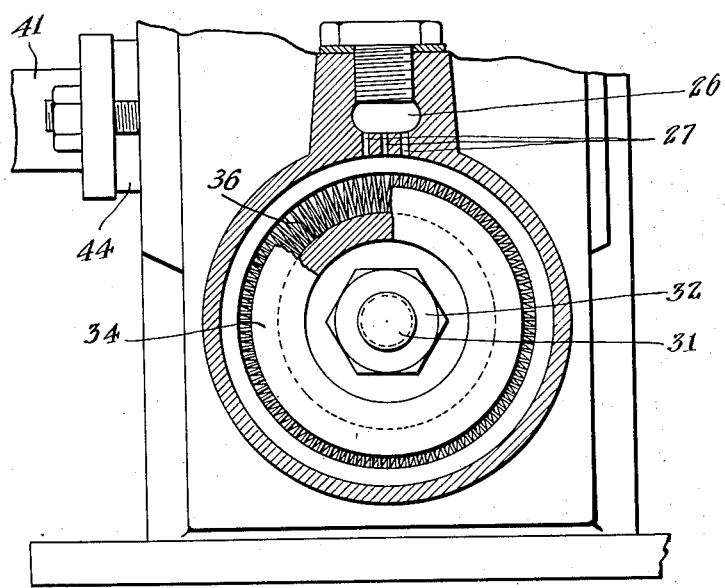
Inventor
Joseph H. McEachern
By Lyon & Lyon
Attorneys Patented Mar. 28, 1933

1,902,876

UNITED STATES PATENT OFFICE

JOSEPH H. McEACHERN, OF SAN FRANCISCO, CALIFORNIA, ASSIGNOR TO STANDARD OIL COMPANY OF CALIFORNIA, OF SAN FRANCISCO, CALIFORNIA, A CORPORATION OF DELAWARE

TANK TRUCK EMERGENCY VALVE SYSTEM AND CONTROLLER

Original application filed November 4, 1924, Serial No. 747,784. Divided and this application filed July 19, 1926. Serial No. 123,330.

This invention relates to improvements in emergency valve systems for tanks, especially the tanks of oil tank wagons on trucks and the like.

This application is a division of my copending application for tank truck emergency valve system and controller, which has issued as Patent No. 1,801,750, April 21, 1931.

In the specification of my Patent No. 1,801,749 granted April 21, 1931, I have described a pressure controlled emergency valve system for tank trucks. The specific embodiment of the invention described in the said application is pneumatically controlled although it is not intended to restrict the generic character of the invention to such pneumatic control. One of the present objects is to disclose a pressure system of the character referred to which is hydraulically controlled.

A further object of the present invention is to provide in the system means for releasing the pressure in the system upon an over rise in temperature to thereby close the emergency valves in the event of fire.

A further object of this invention is the provision of an improved controller or operating pump adapted for employment in the aforesaid system as well as for any of the various uses to which this character of controller or operating pump may be put. Among the advantages sought for such controller or operating pump are the elimination of all valves, and the provision of an elasticity permitting use with an incompressible fluid within predetermined limits.

Other advantages and features of the invention will appear from the following description of the application of one embodiment of all features of the invention to a tank truck, it being understood that the application shown is by way of example, and that the invention is not specifically limited thereto.

In the drawings:

Figure 1 shows a tank truck partly in section, to which the invention has been applied.

Figure 2 is a fragmentary view showing the connections below the tank illustrated in Figure 1.

Figure 5 is a rear elevation of the controller or operating pump with parts broken away.

Figure 6 is a section of the controller or operating pump taken on a line indicated by 6—6 in Figure 4.

Figure 7 is a vertical section taken through the pneumatic operating means corresponding to each valve.

Figure 3:
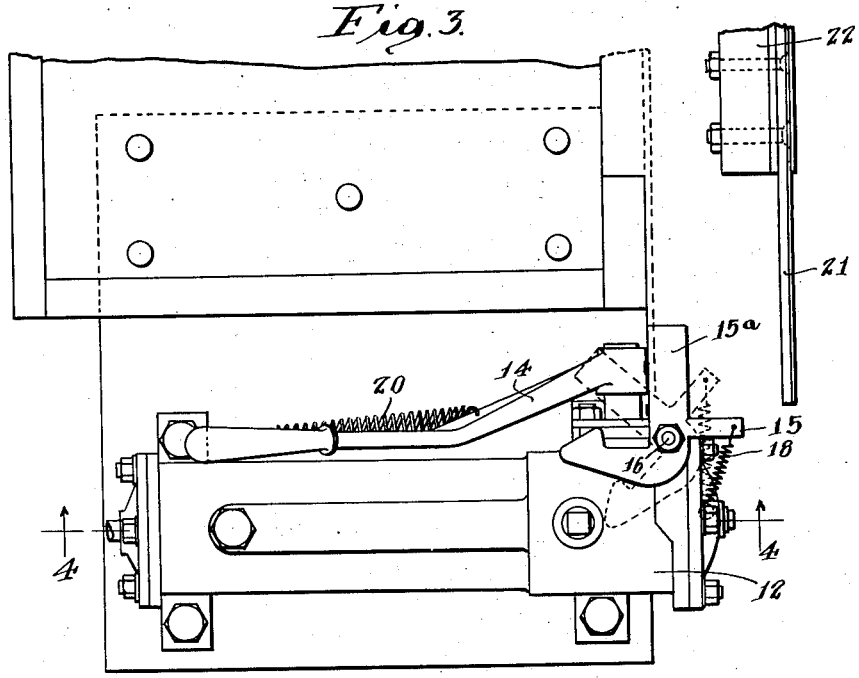
Figure 3 is a plan view of the controller or operating pump as applied to the rear end of the tank truck.

Referring to the drawings: The tank truck illustrated in Figure 1 carries a tank 2 of the type having a plurality of fluid compartments 3. An emergency internal valve 4 is mounted within each compartment by means of a pipe flange 5. The emergency valves 4 correspond in construction to the emergency internal valves described in my said Patent No. 1,801,749, and no further reference will be here made to the construction of these valves other than that they are provided with tension means for normally maintaining the valve closed and are opened by pressure actuated means connected to a pressure line 6. This means is extensible, that is, it becomes extended when the pressure is applied, and thereby opens the valve. A discharge pipe 7, customarily equipped with a faucet 8 is provided for each compartment of the tank and is connected to the discharge side of the valve 4 exterior to the tank. The valve 4 is inserted in the flange 5. A valve 6ª is provided for priming the line 6 and this valve 6ª also serves as one means for venting the said line 6; the valve is illustrated at the forward end of the line 6 but may be placed at any convenient point along its length.

The pressure line 6 is provided with a plurality of crosses 9 corresponding in number to the number of the emergency valves 4 in the tank 2. The emergency valves 4 are respectively connected to the pressure line 6 through lines 10, leading from the crosses 9. The fusible plug 11 is inserted in each cross 9. In the event of fire the fusible plug 11 will respond to the raise in temperature and vent the pressure line 6, closing the emergency valves 4. This assures that the contents of the tank will not drain therefrom in the event the fire prevents the operation of the pressure system control.

The pressure line 6 communicates with a controller or operating pump 12 which is preferably positioned on the side of the bucket box 13 or at any convenient point near the rear of the truck. The controller or operating pump 12 enables the emergency valves 4 to be opened by applying a pressure to the valves 4 through the pressure line 6. A suitable oil will preferably be employed as a hydraulic medium in the pressure system.

The controller or operating pump 12 is actuated by a hand actuated member or operating arm 14. As may be seen, particularly in Figure 3 of the drawings, the controller or operating pump 12 is preferably provided with a latch or tripping device 15, which serves to engage and secure the operating handle 14 when the handle is brought to its rearward or pressure applying position. The latch 15 is pivoted on a pin 16 mounted in the boss 17 and is actuated by a tension spring 18. A bracket 19 serves to position the latch 15 so that it intercepts the operating handle 14. An extension 15ª on the latch 15 is so positioned that it may serve as a means of rocking the latch 15 and releasing the operating arm 14. A spring 20 serves to return the operating arm 14 to forward or pressure releasing position. A striker 21 may be mounted on the swinging end of the pivoted bucket box door 22 to trip the latch 15 to release the operating arm 14 when the door 22 is closed. The latch and tripping arrangement above described may be employed if desired but is not indispensable.

The construction of the controller or operating pump 12 is novel and although particularly adapted for employment in an emergency valve pressure control system, its use is not limited thereto. The construction of this controller or operating pump 12 is shown in detail cross section in Figure 4 of the drawings. The controller or operating pump 12 has a main body forming a cylinder 23 and an oil or fluid reservoir 24. The upper outer wall 25 of the main body of the controller or operating pump is preferably spaced from the cylinder 23 to provide a fluid passage 26 communicating with ports 27. A suitable piston is provided in the cylinder 23 by means of which the fluid from the reservoir or tank 24 may be supplied to and maintained under the required pressure to maintain the valves 4 open. Preferably this piston is of such form and construction as to provide a means for compensating for any leakage of fluid and the automatic maintenance of sufficient pressure to maintain the valves 4 open. Preferably, therefore, the piston is made in two parts including a forward head 28 and a hand operated movable rear part preferably in the form of a piston head 29. As shown these are in the form of cylinders with one end open, the open ends of the cylinders being turned toward each other. Through the end wall of the rear part 29 is inserted a suitable block 46 having a central chamber. This block 46 is provided with a flange 46' which bears upon the end of the piston part 29. 31 represents a connecting rod which extends through the block 46 lengthwise of the piston and through the head of the piston part 28. This rod 31 is preferably provided with a head adapted to bear upon the surface about the opening through the block 46 into the chamber of the cylinder 23. Between the rear part 29 and the forward part 28, I provide compressible means. In the present instance, a suitable spring 30 is interposed between the piston parts 28, 29. 33 represents a cup leather of any ordinary or preferred construction mounted on the front face of the piston 28 and retained in position by means of the spring retainer 34 and washer 35 and expander spring 36 maintained in position by a nut 32 on the end of the rod 31. The lever 14 is capable of assuming a set position that holds the part 29 moved forward with the compressible means or spring 30 in compression, being latched in this position by the latch 15. The spring 30 will maintain pressure in the pipes that carry the liquid to the valves 4. This enables it to keep the valves 4 open in spite of leakage of the operating liquid.

Figure 4:
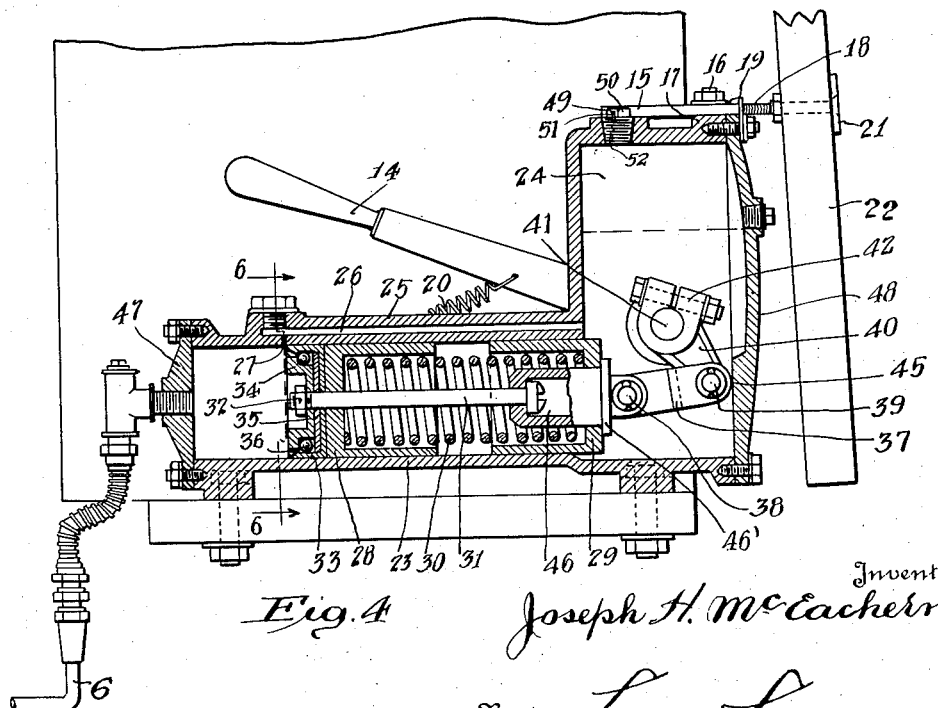
Figure 4 is a vertical section through the controller or operating pump taken on the line indicated at 4—4 in Figure 3.

A yoke 37 is connected at a pin 38 to the block 46 and at its opposite end at a pin 39 to a lever arm 40. The lever arm 40 is rigidly connected with the shaft 41 by means of a pinch collar 42. The operating arm 14 is also rigidly secured to the shaft 41 by a pinch collar 43. A packing gland 44 prevents the leakage of fluid at the point where the shaft 41 projects from the housing. The motion imparted to the rear piston head 29 by the operating arm 14 is restricted by the lever arm 40 striking a stop 45 in one direction and in the reverse direction when the operating arm 14 strikes the latch 15. The spring 30 is normally held in compression between the front and rear piston parts 28, 29 by the rod 31. When the arm 14 has been operated to actuate the piston inward, the pressure of fluid in the system is normally sufficient to stop the inward motion of the front end 28 of the piston and to cause the rear end 29 of the piston to further compress the spring 30 thus providing for the maintenance of pressure upon the system. The front head 47 and rear head 48 are suitably secured to the controller or pump body so as to maintain the whole fluid tight. When the lever arm 40 is against the stop 45, the cup leather 33 is behind the ports 27 and fluid connection exists between the cylinder 23 through the ports 27 and fluid passage 26 to the fluid reservoir 24. Referring to Figure 4, 49 indicates a tapered screw plug having a square head 50 through which is formed a transverse passage 51 that communicates with a vertical passage 52 extending up from the lower end of the plug. When the plug is in place in the opening in the reservoir 24, these passages provide an outlet from the interior of the reservoir to the atmosphere, thus insuring at all times that only atmospheric pressure will exist in the reservoir 24. The operating pump 12, as illustrated in Figure 4 of the drawings, is in the position in which the emergency shut-off valves 4 are closed since the cup leather 33 is behind the ports 27, and the pressure line 6 and emergency valves 4 contain fluid subject only to atmospheric pressure plus the small static head necessary to keep the system full of fluid. The springs within the emergency shut-off valves, described in detail in Patent No. 1,801,749, are made sufficiently strong to overcome the static head and firmly seat and maintain the emergency shut-off valves normally firmly seated. To raise the emergency shut-off valves 4, the operating handle 14 is pulled back and engaged in the latch 15, forcing the part 29 forward a given distance. The forward movement of this part 29 also causes a forward movement of the forward piston part 28 through the medium of the compression spring 30. The cup leather 33 moving with the piston closes off the ports 27 and the fluid is forced into the pressure line 6. The compression spring 30 is so designed that the piston will be forced forward as a unit until a predetermined pressure within the cylinder 23 is established equal to the compressive force of the spring 30. On further movement of the part 29, the spring 30 is further compressed as the pressure increases on the face of the piston 28. The predetermined pressure at which the compression spring 30 is further compressed is sufficient to overcome the spring tension maintaining the emergency valves normally closed, and allows the expansible bellows in such emergency valves to be inflated to open the valves, without subjecting the emergency valves 4 to a hydraulic pressure sufficiently high to endanger or rupture the expansible bellows in such valves. The compression spring 30 serves the further purpose of providing for maintaining the emergency valves 4 in a fully open position against a certain amount of fluid leakage as the front piston 28 with the cup leather 33 will tend to move forward within the range of the additional or stored compression of the spring 30, to overcome any fluid leakage by additional displacement of fluid from the cylinder 23. To release the hydraulic pressure in the line 6 and thus permit the emergency valves 4 to assume their normal closed position, the operating handle 14 is disengaged from the latch 15, either manually or by contact with the striker 21, and the pressure exerted by the springs in the emergency valves 4 upon the fluid in the pressure line system thus forces the piston 28 in the controller or operating pump 12, aided by the tension spring 20 on the operating handle 14 back to the emergency valve open position shown in Figure 4. When the piston 28 is in its position of rest, which may be called its "non-pressure position," the port 27 is open and the liquid in the pressure lines 6 and 10 is forced by the spring loaded valves 4 back into the reservoir 24 which is vented to the atmosphere. By reason of the open communication between the pressure lines 5 and 10 and the vented reservoir 24, it is impossible in case of fire for pressure to build up in the lines sufficiently to cause the valves 4 to open when the piston 28 is in the non-pressure position.

The construction of the controller or operating pump 12 is such that no valves are used in the system and the liability of valve leakage is eliminated. The cup leather 33 with the expander spring 36 moving in the cylinder 23 provides a fluid tight device. Through the employment of the above described piston assembly an elastic mechanical medium is provided, although the hydraulic medium is a practically incompressible fluid, thus allowing the operating handle 14 to be given a fixed and definite motion for opening the emergency shut-off valves and providing for the limiting to a predetermined value the fluid pressure that may be exerted upon the emergency shut-off valves and further providing an elastic takeup to maintain that pressure against a certain amount of fluid leakage. It is evident that the pressure in the cylinder 12 and in the pipe system will depend upon the force of the spring 30; the lighter the spring, the lower will be the pressure in the pipe system.

The above described arrangement provides an emergency shut-off valve system for tanks, particularly useful for tank trucks and the like, which is positive in operation and convenient and practical in installation. In cases of a fire occurring while the tank truck is being discharged, the fuse plugs 11 will vent the pressure line immediately closing the emergency shut-off valves, although the fire prevents movement of the operating arm 14. The bucket box door on the tank truck is always closed by the driver prior to starting the truck since, if he does not close this door, the buckets and funnels carried within the box will fall out. It is assured that the emergency shut-off valves will be closed although the driver forgets to move the operating handle 14 because when the driver closes the bucket box door, the striker 21 will release the latch 15 and the operating arm 14 will automatically move to its pressure releasing position.

The invention is not specifically limited to the particular arrangement and construction above described, but is of the scope set forth in the appended claims.

I claim:

1. In a hydraulic control system for controlling pressure actuated means on a truck, the combination of pipes holding liquid under pressure in communication with the pressure actuated means, a cylinder connected with the pipes, a piston having a head movable in the cylinder, a movable part associated with the piston head, compressible means between the movable part and the piston head, a hand-actuated member connected with the movable part capable of assuming a set position holding the compressible means partially compressed and thereby maintaining the liquid in the pipes under pressure, means for latching the hand-actuated member in said set position, and means for releasing the latch by a movable part of the truck.

2. In a hydraulic control system for controlling pressure actuated means on a truck, the combination of pipes holding liquid under pressure in communication with the pressure actuated means, a cylinder connected with the pipes, a piston having a head movable in the cylinder, a movable part associated with the piston head, compressible means between the movable part and the piston head, a hand-actuated member connected with the movable part capable of assuming a set position holding the compressible means partially compressed and thereby maintaining the liquid in the pipes under pressure, means for latching the hand-actuated member in said set position, means for releasing the latch by a movable part of the truck, and a spring operating to move the piston head in a direction to relieve the pressure in the pipes when the latch is released.

3. In a hydraulic control system for controlling pressure actuated means on a truck, the combination of pipes holding liquid under pressure in communication with the pressure actuated means, a cylinder connected with the pipes, a piston having a forward head movable in the cylinder and having a rear head movable in the cylinder with a compression spring located between the said heads, a hand-actuated member connected with the rear head capable of assuming a set position holding the spring partially compressed and thereby maintaining the liquid in the pipes under pressure, means for latching the hand-actuated member in said set position, and a reservoir for the liquid communicating with the rear end of the cylinder and having a port connecting the interior of the reservoir with the cylinder at a point forward of the forward head.

4. In a hydraulic control system including hydraulic bellows for actuating parts in the system, the combination of pipes carrying liquid under pressure, a cylinder connected with the pipes, a piston having a head movable in the cylinder, a movable part associated with the piston head, compressible means between the movable part and the piston head capable of substantial compression to store up energy, a hand-actuated member connected with the movable part, capable of assuming a set position at the limit of its forward movement, for holding the compressible means partially compressed and thereby maintaining the liquid in the pipes under pressure, and means for latching the hand-actuated means in said set position, said compressible means operating to limit the internal pressure imparted to the bellows.

5. In a hydraulic control system including hydraulically actuated extensible means the combination of pipes holding liquid under pressure in communication with the extensible means, a cylinder connected with the pipes, a piston freely movable in the cylinder and having a forward head and a rear head fitting the cylinder bore and guided therein, a compression spring located between the said heads, a hand-actuated member a connection including a link pivotally connected with the rear head, said hand-actuated member capable of assuming a set position holding the spring partially compressed and thereby maintaining the liquid in the pipes under pressure, and means cooperating with said parts for holding the rear head in any position in which it is set.

6. In a hydraulic control system including hydraulic bellows for actuating parts in the system, the combination of pipes carrying liquid under pressure, a cylinder connected with the pipes, a piston having a head freely movable in the cylinder, a movable part associated with the piston head, compressible means between the movable part and the piston head capable of substantial compression to store up energy, a hand actuated member, a connection including a link pivotally connected with the movable part, said movable part capable of assuming a set position holding the compressible means partially compressed and thereby maintaining the liquid in the pipes under pressure, and means cooperating with the aforesaid parts for holding said movable part in said set position, said compressible means operating to protect the bellows by limiting the internal pressure imparted to the bellows.

7. In a hydraulic control system including hydraulic bellows for actuating parts in the system, the combination of pipes carrying liquid under pressure, a cylinder connected with the pipes, a piston having a forward head freely movable in the cylinder and having a rear head freely movable in the cylinder, a spring located between the said heads, a rod connecting said heads and limiting the separation of said heads by the spring, said rod being capable of a relatively sliding movement with respect to the rear head when the same is moved forwardly, and means for forcing the rear head forwardly to apply pressure to liquid in the cylinder, said spring operating to limit said pressure.

Signed at San Francisco, Calif., this 9th day of July 1926.

JOSEPH H. McEACHERN.